US008266800B2

(12) United States Patent
Segletes et al.

(10) Patent No.: US 8,266,800 B2

(45) Date of Patent: Sep. 18, 2012

(54) REPAIR OF NICKEL-BASED ALLOY TURBINE DISK

(75) Inventors: David Scott Segletes, Oviedo, FL (US); Brij B. Seth, Maitland, FL (US); Srikanth C. Kottilingam, Orlando, FL (US); Peter Jon Ditzel, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1409 days.

(21) Appl. No.: 10/938,713

(22) Filed: Sep. 10, 2004

(65) Prior Publication Data

US 2005/0050705 A1 Mar. 10, 2005

Related U.S. Application Data

(60) Provisional application No. 60/501,869, filed on Sep. 10, 2003.

(51) Int. Cl.
*B23P 6/00* (2006.01)

(52) U.S. Cl. ................. 29/889.1; 29/402.06; 29/402.08; 29/402.11; 29/402.13; 29/402.18

(58) Field of Classification Search ................. 29/889.1, 29/402.01, 402.06, 402.08, 402.09, 402.11, 29/402.13, 402.16
See application file for complete search history.

(56) References Cited

U.S. PATENT DOCUMENTS 2,276,643 A * 3/1942 Bates .............................. 219/50
3,207,599 A * 9/1965 Franklin et al. ............... 420/446
3,940,268 A 2/1976 Catlin
4,005,515 A 2/1977 Sundt
4,152,816 A 5/1979 Ewing et al.
4,203,705 A 5/1980 Wesbecher
4,270,256 A 6/1981 Ewing
4,409,462 A * 10/1983 Jahnke ..................... 219/121.14
4,538,331 A 9/1985 Egan et al.
4,581,300 A 4/1986 Hoppin, III et al.
4,608,094 A 8/1986 Miller et al.
4,636,124 A 1/1987 Gugle et al.
4,657,171 A * 4/1987 Robins .......................... 228/119
4,680,160 A 7/1987 Helmink
4,782,206 A * 11/1988 Ayres et al. ................ 219/76.14

(Continued)

OTHER PUBLICATIONS

Advances in Net-Shape Powder Metallurgy: New manufacturing processes could lower turbine engine costs and improve performance and reliability. AFRL Technology Horizons, Feb. 2004, p. 33-34.

(Continued)

*Primary Examiner* — Essama Omgba

(57) ABSTRACT

A method of adding material to a nickel-based superalloy component, such as a gas turbine rotor disk, without damaging the underlying material and without creating an unacceptable level of cracking. The method is advantageously applied in the repair of Alloy 706 turbine rotors having experienced operating failures in the steeple region of the disk. Once the damaged material is removed, replacement nickel-based superalloy material is added using a welding process that protects both the underlying material and the replacement material. The replacement material may be added by welding, with the preheat temperature maintained no lower than 100° C. below the aging temperature of the deposited alloy and with the interpass temperature maintained below the solution annealing temperature of the alloy. Alternatively, the replacement material may be preformed and welded to the original material using a friction welding process. In one embodiment, a replacement steeple of directionally solidified or single crystal material is installed onto a disk hub using a linear friction welding technique.

9 Claims, 2 Drawing Sheets

U.S. PATENT DOCUMENTS

| | | | | |
|---|---|---|---|---|
| 4,787,821 | A | 11/1988 | Cruse et al. | |
| 4,820,358 | A | 4/1989 | Chang | |
| 4,825,522 | A | 5/1989 | Iwai et al. | |
| 4,893,388 | A * | 1/1990 | Amos et al. | 29/889.1 |
| 4,897,519 | A * | 1/1990 | Clark et al. | 219/76.14 |
| 4,900,635 | A | 2/1990 | Bowen et al. | |
| 4,903,888 | A | 2/1990 | Clark et al. | |
| 4,958,431 | A | 9/1990 | Clark et al. | |
| 4,962,586 | A | 10/1990 | Clark et al. | |
| 5,024,582 | A * | 6/1991 | Bellows et al. | 416/213 R |
| 5,161,950 | A | 11/1992 | Krueger et al. | |
| 5,189,279 | A * | 2/1993 | Foster et al. | 219/137 R |
| 5,240,167 | A * | 8/1993 | Ferte et al. | 228/114.5 |
| 5,248,077 | A * | 9/1993 | Rhoades et al. | 228/112.1 |
| 5,253,978 | A | 10/1993 | Fraser | |
| 5,319,179 | A * | 6/1994 | Joecks et al. | 219/137 R |
| 5,350,561 | A * | 9/1994 | Takamura et al. | 420/105 |
| 5,460,317 | A | 10/1995 | Thomas et al. | |
| 5,561,827 | A | 10/1996 | Reeves et al. | |
| 5,591,363 | A * | 1/1997 | Amos et al. | 219/137 PS |
| 5,688,108 | A | 11/1997 | Dierksmeier et al. | |
| 5,704,765 | A | 1/1998 | Amos et al. | |
| 5,746,579 | A | 5/1998 | Amos et al. | |
| 5,755,030 | A | 5/1998 | Fraser | |
| 5,769,306 | A | 6/1998 | Colligan | |
| 5,831,241 | A * | 11/1998 | Amos | 219/137 PS |
| 5,914,055 | A * | 6/1999 | Roberts et al. | 219/76.15 |
| 5,960,249 | A | 9/1999 | Ritter et al. | |
| 5,971,247 | A | 10/1999 | Gentry | |
| 6,022,194 | A * | 2/2000 | Amos et al. | 416/219 R |
| 6,079,609 | A | 6/2000 | Fochtman | |
| 6,118,098 | A | 9/2000 | Amos et al. | |
| 6,173,880 | B1 | 1/2001 | Ding et al. | |
| 6,230,957 | B1 | 5/2001 | Arbegast et al. | |
| 6,237,835 | B1 | 5/2001 | Litwinski et al. | |
| 6,259,052 | B1 | 7/2001 | Ding et al. | |
| 6,332,272 | B1 * | 12/2001 | Sinnott et al. | 29/889.1 |
| 6,333,484 | B1 * | 12/2001 | Foster et al. | 219/121.64 |
| RE37,562 | E | 2/2002 | Clark et al. | |
| 6,457,629 | B1 * | 10/2002 | White | 228/112.1 |
| 6,484,924 | B1 | 11/2002 | Forrest | |
| 6,491,208 | B2 | 12/2002 | James et al. | |
| 6,496,529 | B1 | 12/2002 | Jones et al. | |
| 6,613,447 | B2 | 9/2003 | Aota et al. | |
| 6,619,534 | B2 | 9/2003 | Aota et al. | |
| 6,709,771 | B2 | 3/2004 | Allister | |
| 6,719,858 | B2 | 4/2004 | Bond et al. | |
| 6,780,089 | B2 | 8/2004 | Pan et al. | |
| 6,814,823 | B1 * | 11/2004 | White | 156/73.1 |
| 7,078,647 | B2 * | 7/2006 | Kou et al. | 219/75 |
| 8,006,380 | B2 * | 8/2011 | Rawson et al. | 29/889.1 |
| 2003/0108767 | A1 * | 6/2003 | Feng et al. | 428/680 |
| 2004/0056075 | A1 * | 3/2004 | Gheorghe | 228/199 |
| 2004/0099714 | A1 * | 5/2004 | Strusinski et al. | 228/232 |
| 2007/0084047 | A1 * | 4/2007 | Lange et al. | 29/889.1 |
| 2009/0057275 | A1 * | 3/2009 | Chen et al. | 219/76.1 |

OTHER PUBLICATIONS

PR5520. Linear Friction Welding of Blisks for Gas Turbine Components. For: A Group of Sponsors. Sep. 2001. 4 pages.

* cited by examiner

REPAIR OF NICKEL-BASED ALLOY TURBINE DISK

This application claims benefit of the 10 Sep. 2003 filing date of U.S. provisional application No. 60/501,869.

FIELD OF THE INVENTION

This invention relates generally to the field of materials technology, and more particularly to the repair of superalloy components such as gas turbine disks.

BACKGROUND OF THE INVENTION

Nickel-based superalloy materials are known for use in high temperature, high stress environments such as in the hot combustion gas path of a gas turbine engine. In one application, the nickel-based superalloy known as Alloy 706 (AMS Specification 5701) is used to form the turbine rotor discs of a gas turbine engine. The discs have a generally annular shaped hub portion and an outermost rim portion shaped into a plurality of steeples or dovetails for engaging a respective plurality of turbine blades. Several discs are joined together along an axis of rotation to form a gas turbine rotor.

Turbine discs formed of Alloy 706 have experienced failures during operation. These disks were formed with a two-step heat treatment; i.e. 970° C. solution anneal followed by a 730° C.+620° C. aging treatment (heat treatment B in AMS Specification 5701). This material exhibits a degree of notch sensitivity, i.e., its Larson-Miller Parameter values for a notched bar are lower than those for a smooth specimen at equivalent stress levels, and this is a suspected damage mode for the failed turbine disks. This type of behavior is also known as stress-assisted grain boundary oxidation (SAGBO). To avoid future failures, the failed disks may be replaced with disks formed of a material exhibiting improved notch sensitivity. One example of such a material is Alloy 706 material subjected to a three step heat treatment; i.e. 970° C. anneal followed by a 845° C. stabilizing treatment followed by a 730° C.+620° C. aging treatment (heat treatment A in AMS Specification 5701). Another material that may be used for the replacement disks is Alloy 718 (AMS Specification 5663). However, regardless of the material selected, there is a significant cost associated with the replacement of failed turbine disks.

It is known in the art to repair turbine disks made of low alloy Ni—Cr—Mo—V or Cr—Mo—V steels, such as are used in steam turbine applications. However, repairs have not previously been performed on the stronger nickel-based superalloys that are used in modern gas turbine engines, since fusion welding of such materials in typical disk thicknesses is generally not possible without cracking.

BRIEF DESCRIPTION OF THE DRAWINGS

The invention is explained in following description in view of the drawings that show.

DETAILED DESCRIPTION OF THE INVENTION

The present inventors have discovered a method for repairing a damaged nickel-based superalloy turbine disks. The method includes removing a damaged rim portion of the disk and installing a replacement rim portion onto the disk with a process that avoids the weld cracking problems of the prior art and that protects the properties of the underlying original disk material.

Figure 1:
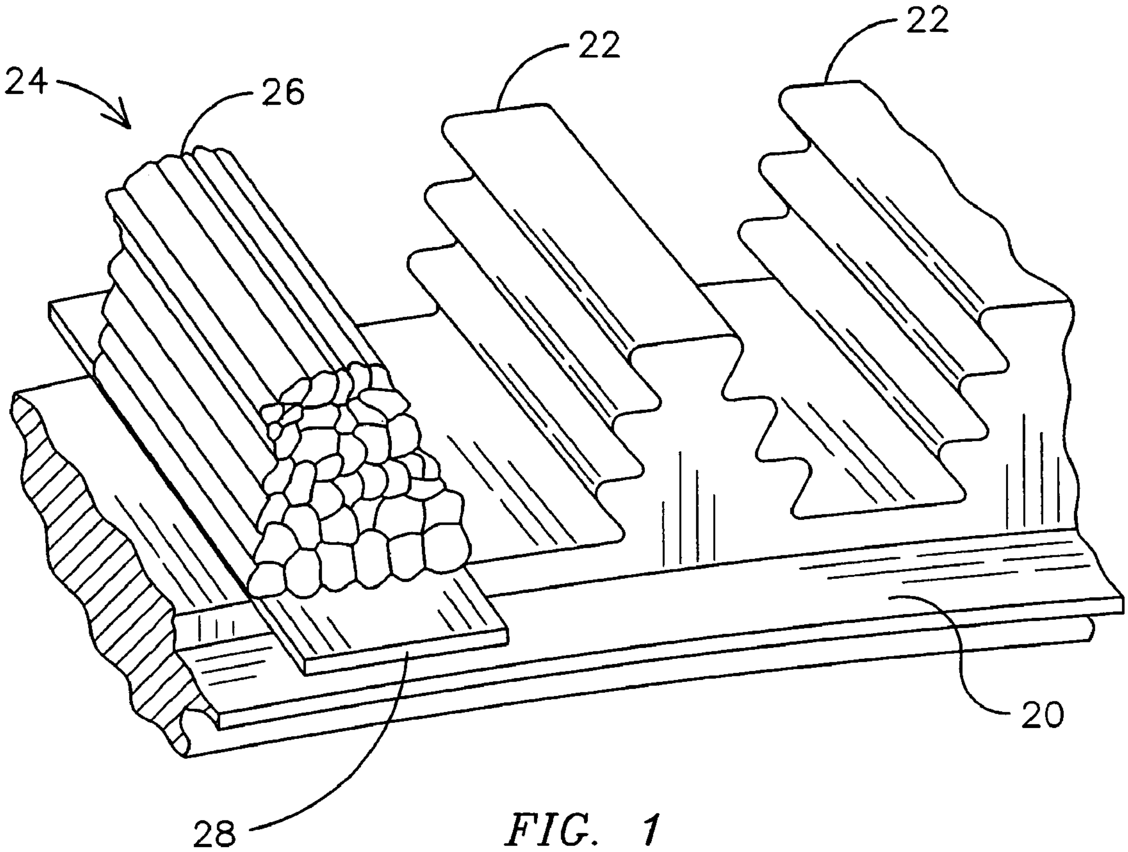
FIG. 1 is a partial perspective view of a gas turbine disk being repaired with a single steeple repair technique.

FIG. 1 illustrates a nickel-based gas turbine disk 20 including a plurality of steeples 22 shaped to engage the root portions of a plurality of blades (not shown) there between. The disk 20 may be formed of Alloy 706, for example. FIG. 1 illustrates the disk 20 at a stage of repair wherein a damaged one of the steeples (not shown) has been removed from repair region 24, such as by grinding, machining, electric arc gouging or other known method. The surface (also not shown) created by the removal of the damaged portion of the disk 20 may be conditioned to bright metal, such as with denatured alcohol, acetone or other known cleaning process. The surface may further be inspected to confirm that all damaged material has been removed, such as by dye penetrant testing, for example.

In place of the removed damaged material, a replacement steeple 26 is formed by a weld build-up process that does not adversely affect the properties of the underlying material of the original disk 20 and that is not subject to an unacceptable level of reheat cracking. In one embodiment, the welding filler metal is selected to be in accordance with AMS Specification 5832 for Alloy 718 welding wire in order to provide a desired degree of strength and resistance to service related damage. Welding is accomplished with a set of low heat input parameters utilizing a laser, electron beam, or gas tungsten arc welding process. The preheating temperature is controlled to be no more than 100° C. below the aging temperature for the deposited alloy so as to continuously age the weld deposit and to develop desired mechanical properties without the need for additional heat treatment, which could otherwise have an adverse effect on the properties of the underlying original disk material. For the embodiment of Alloy 718 welding wire, the minimum preheat temperature would be 620° C. In one embodiment, the preheat temperature is maintained to be at least the aging temperature of the alloy. In addition, the interpass temperature is controlled to be below the solution annealing temperature of the alloy (925° C. in this embodiment), also to ensure a desired aging response. Multiple layers of material are used to achieve a gross steeple shape, as illustrated in FIG. 1. Welding tabs 28 may be used where appropriate. The gross steeple shape is then final machined or ground to achieve the desired final steeple shape consistent with the original steeples 22.

Figure 2:
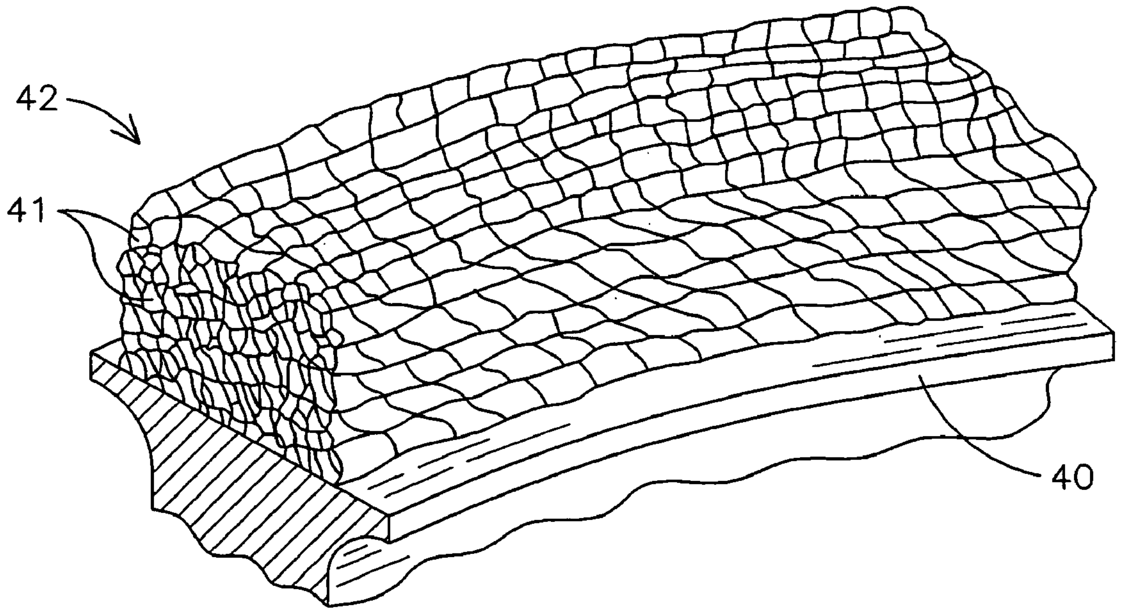
FIG. 2 is a partial perspective view of a gas turbine disk being repaired with a 360° repair technique.

FIG. 2 illustrates a further embodiment wherein all of the steeples have been removed from a damaged turbine rotor disk 40. Multiple layers 41 of nickel-based superalloy weld metal are then deposited to create a ring 42. New steeples (not shown) are then formed from the ring 42 by any known material removal process. The preheat temperature and the interpass temperature are controlled during the welding process in the manner described above with respect to the process of FIG. 1 so as to provide a desired degree of aging to underlying layers of weld metal and to protect the underlying material of the original disk 40 from harmful heat treatment effects.

Figure 3:
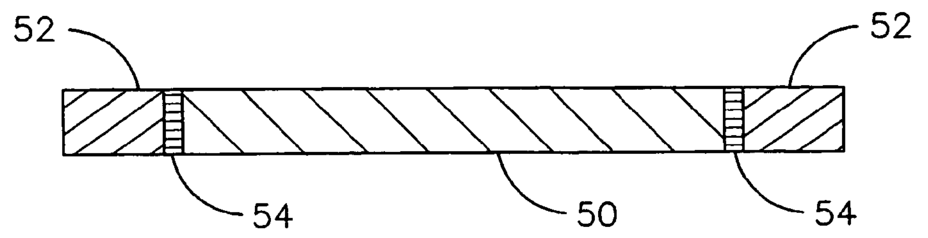
FIG. 3 is a cross-sectional view of a gas turbine disk being repaired with the installation of a ring of replacement steeple material.

FIG. 3 illustrates an alternative process for replacing all of the steeples of a damaged turbine disk 50. In order to minimize the effect of welding on the underlying original disc material and in order to reduce the time required for the repair, a ring 52 of replacement nickel-based superalloy material is welded onto the hub portion of original disk 50 using a welding process that preserves the underlying original disk material and that avoids reheat cracking in the weld metal. In one embodiment, a narrow groove configuration utilizing a gas tungsten arc process may be employed to form attachment weld 54. Following the attachment of the ring 52, the geometry of the steeples is restored into the ring 52 with a material removal process such as machining or grinding. As described above, the filler metal is selected to meet required properties and the preheat and interpass temperatures are controlled to provide a desired degree of aging of the alloy material without additional post-weld heat treatment.

Figure 4:
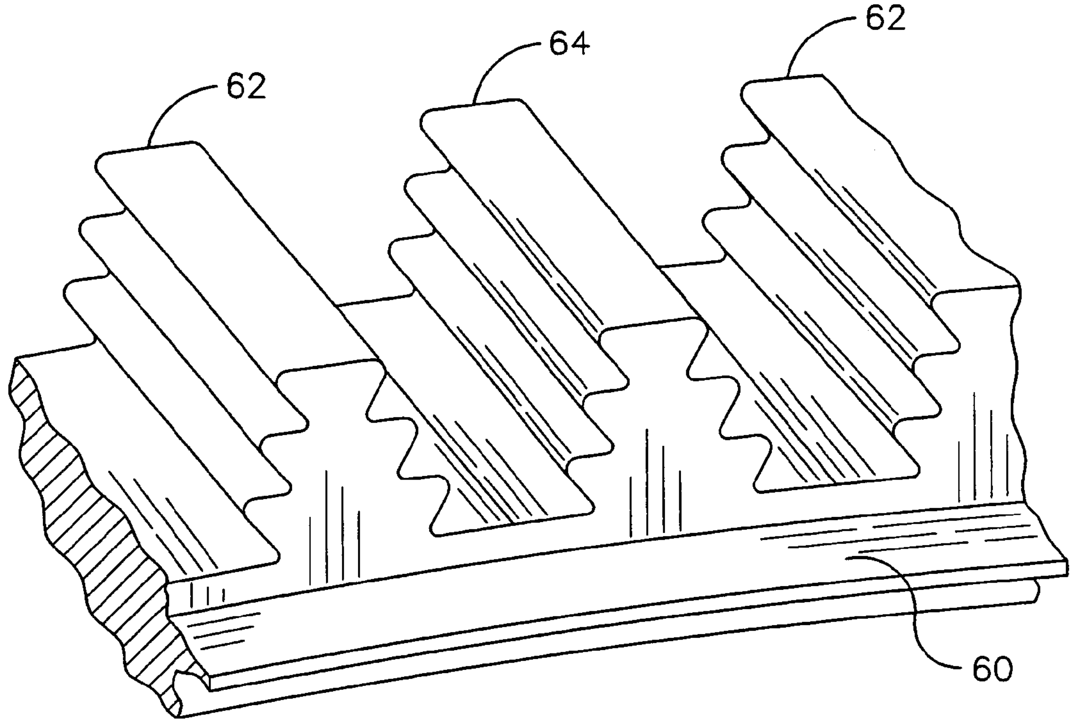
FIG. 4 is a partial plan view of a gas turbine disk being repaired with a linear friction welding technique.

FIG. 4 illustrates a further embodiment of a gas turbine disk 60 wherein a damaged steeple (not shown) has been removed from between two undamaged steeples 62 and a replacement steeple 64 is installed in its place. In this embodiment, the replacement steeple 64 is joined to the original disk 60 by a linear friction welding process. Linear friction welding is a solid phase joining technique that uses a linear reciprocating motion to generate friction heat, as opposed to the more common rotary motion used in conventional friction welding. The weld is accomplished by oscillating a surface of the steeple against a surface of a nickel-based superalloy turbine disk while applying a force there between to cause inter-diffusion between the adjoined material. Once the oscillations are ceased, the melted material will solidify and join the steeple to the disk. Linear friction welding allows the replacement steeple 64 to be welded to the underlying original disk material 60 between two existing original steeples 62 if desired. In other embodiments, groups of adjoined adjacent replacement steeples may be simultaneously joined along an arc length of an original disk 60 using a linear friction welding technique. This solid phase joining technique provide high integrity, low distortion joints in these difficult to weld nickel-based superalloy materials. This method allows the replacement steeple 64 to be fabricated from the same material/heat treatment as the original disk 60 (such as Alloy 706, heat treatment B) or from a different material and/or different heat treatment (such as such as Alloy 706, heat treatment A or Alloy 718). In other embodiments, the replacement steeple may be formed of directionally solidified or single crystal material and joined to the polycrystalline original disk 60.

In the method of FIG. 4, the original damaged steeple(s) is/are removed such as by machining and new replacement steeple(s) 64 is/are formed. Appropriate heat treatment and/or non-destructive examination techniques may be performed on the original disk 60 and/or the replacement steeple 64. The replacement steeple 64 is then joined to the disk 60 by linear friction welding. The relative motion may be achieved by holding the disk 60 stationary and subjecting the steeple 64 to reciprocating motion while a force is applied there between. Typical linear friction welding parameters for such applications may be:

| | | |
|---|---|---|
| Friction force per unit area - | 50-300 | Mpa |
| Forge force - | 75-450 | Mpa |
| Burn-off - | 0.5-5 | mm |
| Oscillation amplitude | 1-7.5 | mm |
| Oscillation frequency | 20-120 | Hz |

The welding process will produce a weld flash of waste material around the perimeter of the joint, and this weld flash is removed and the weld inspected. Post weld heat treatment may be performed, if desired, any final machining done and a final nondestructive examination conducted, as appropriate for the application.

Figure 5:
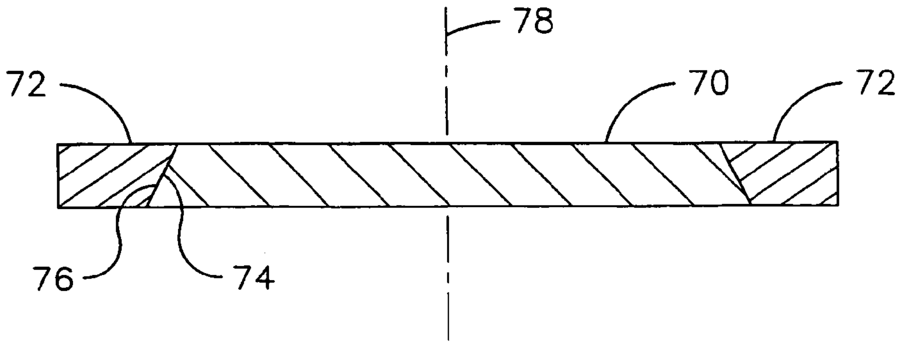
FIG. 5 is a cross-sectional view of a gas turbine disk being repaired with a rotary friction welding technique.

A further embodiment is illustrated in FIG. 5, where a damaged superalloy turbine disk 70 is repaired by removing all of the original steeples (not shown) and by welding on a replacement ring of superalloy material 72 using a rotary friction welding technique. The mating surfaces 74, 76 of the original disk 70 and ring 72 are angled relative to the rotating axis 78 of the disk 70. One of the disk 70 and ring 72 is then rotated about the axis 78 while the surfaces 74, 76 are forced together to create the friction weld there between. The replacement steeples (not shown) are then formed in the ring 72 by a material removal process.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method comprising:

removing a damaged portion of an original nickel-based superalloy turbine disk;

welding a replacement nickel-based superalloy material to the disk in place of the removed damaged portion using a welding process comprising:

maintaining a preheating temperature to be between an aging temperature of the replacement material and 100° C. below the aging temperature of the replacement material; and controlling an interpass temperature to be below a solution annealing temperature of the replacement material;

wherein the steps of maintaining the preheating temperature and controlling the interpass temperature are effective to provide a desired degree of aging and to develop desired mechanical properties in the welded material without the need for additional heat treatment.

2. The method of claim 1, further comprising:

removing a damaged portion of an original Alloy 706, AMS Specification 5701 heat treatment B material disk; and welding a separately formed replacement steeple formed of directionally solidified material to the disk.

3. The method of claim 1, further comprising:

removing a damaged portion of an original Alloy 706, AMS Specification 5701 heat treatment B material disk; and welding a separately formed replacement steeple formed of single crystal material to the disk.

4. The method of claim 1, further comprising:

removing a damaged steeple of the original nickel-based superalloy turbine disk;

welding a gross steeple shape to the disk in place of the removed damaged portion; and forming a final replacement steeple shape from the gross steeple shape.

5. The method of claim 1, further comprising:

removing all steeples from the original nickel-based superalloy turbine disk;

welding a ring to the disk in place of the removed steeples; and forming replacement steeples from the ring.

6. The method of claim 5, wherein the ring is formed by a plurality of layers of weld metal.

7. A method comprising:

removing a damaged portion of an original nickel-based superalloy turbine disk;

welding a replacement nickel-based superalloy material to the disk in place of the removed damaged portion using a welding process comprising:

maintaining a preheating temperature to be between an aging temperature of the replacement material and 100° C. below the aging temperature of the replacement material; and controlling an interpass temperature to be below a solution annealing temperature of the replacement material, further comprising:

removing a damaged portion of an original Alloy 706, AMS Specification 5701 heat treatment B material disk; and welding a replacement Alloy 706, AMS Specification 5701 heat treatment A material to the disk;

wherein the steps of maintaining the preheating temperature and controlling the interpass temperature are effective to provide a desired degree of aging and to develop desired mechanical properties in the welded material without the need for additional heat treatment.

8. A method comprising:

removing a damaged portion of an original nickel-based superalloy turbine disk;

welding a replacement nickel-based superalloy material to the disk in place of the removed damaged portion using a welding process comprising:

maintaining a preheating temperature to be between an aging temperature of the replacement material and 100° C. below the aging temperature of the replacement material; and controlling an interpass temperature to be below a solution annealing temperature of the replacement material, further comprising:

removing a damaged portion of an original Alloy 706, AMS Specification 5701 heat treatment B material disk; and welding a replacement Alloy 718, AMS Specification 5663 material to the disk;

wherein the steps of maintaining the preheating temperature and controlling the interpass temperature are effective to provide a desired degree of aging and to develop desired mechanical properties in the welded material without the need for additional heat treatment.

9. The method of claim 8, further comprising:

maintaining the preheating temperature to be at least 620° C.; and controlling the interpass temperature to below 925° C.

* * * * *